(12) United States Patent
Hadinata et al.

(10) Patent No.: US 9,998,910 B2
(45) Date of Patent: *Jun. 12, 2018

(54) ROUTE NAVIGATION FOR OPTIMAL MOBILE COVERAGE

(71) Applicant: International Business Machines Corporation, Armonk, NY (US)

(72) Inventors: Martinianus B. Hadinata, Brunnen (CH); Charles S. Lingafelt, Durham, NY (US); John E. Moore, Jr., Brownsburg, IN (US); Brian M. O'Connell, Cary, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 316 days.

This patent is subject to a terminal disclaimer.

(21) Appl. No.: 14/631,933

(22) Filed: Feb. 26, 2015

(65) Prior Publication Data

US 2015/0172908 A1 Jun. 18, 2015

Related U.S. Application Data

(63) Continuation of application No. 13/933,100, filed on Jul. 1, 2013, now Pat. No. 9,055,412, which is a
(Continued)

(51) Int. Cl.
*G01C 21/00* (2006.01)
*H04W 8/08* (2009.01)
(Continued)

(52) U.S. Cl.
CPC .......... *H04W 8/08* (2013.01); *G01C 21/3461* (2013.01); *H04W 48/16* (2013.01)

(58) Field of Classification Search
None
See application file for complete search history.

(56) References Cited

U.S. PATENT DOCUMENTS 6,188,905 B1 * 2/2001 Rudrapatna et al. ...... 455/452.2
6,799,016 B2 9/2004 Davis et al.
(Continued)

OTHER PUBLICATIONS

Office Action (dated Dec. 20, 2013) for U.S. Appl. No. 13/933,100, filed Jul. 1, 2013.
(Continued)

*Primary Examiner* — Rachel L. Porter
(74) *Attorney, Agent, or Firm* — Schmeiser, Olsen & Watts; William H. Hartwell

(57) ABSTRACT

A method and system for determining measures of cell phone coverage along a travel route. Received are: a specification of a travel destination by a road vehicle, a projected starting time for a user to begin travel along the travel route from a starting location of the vehicle to the travel destination, and a telephone carrier service for the cell phone. Measures of cell phone coverage along the travel route are determined and include: (i) amounts of dropped calls by the telephone carrier service in areas along the travel route in which the telephone carrier service provides cell phone coverage, (ii) a quality of cell phone service by the telephone carrier service, correlated to time of day, along the travel route, or (iii) both the amounts of dropped calls and the quality of cell phone service. The measures of cell phone coverage along the travel route are displayed.

18 Claims, 4 Drawing Sheets

Related U.S. Application Data continuation of application No. 12/186,226, filed on Aug. 5, 2008, now abandoned.

(51) Int. Cl.
*G01C 21/34* (2006.01)
*H04W 48/16* (2009.01)

(56) References Cited

U.S. PATENT DOCUMENTS

| | | | | |
|---|---|---|---|---|
| 6,898,432 | B1* | 5/2005 | Jiang | H04W 4/04 370/310.2 |
| 9,055,412 | B2 | 6/2015 | Hadinata et al. | |
| 2004/0249569 | A1 | 12/2004 | Oh | |
| 2006/0135180 | A1* | 6/2006 | Jakel | H04W 48/16 455/456.5 |
| 2006/0223523 | A1* | 10/2006 | Houllier | H04W 16/18 455/423 |
| 2007/0211676 | A1* | 9/2007 | Sharma | G01C 21/00 370/338 |
| 2008/0234927 | A1* | 9/2008 | O'Neill | G01C 21/34 701/465 |
| 2009/0005073 | A1* | 1/2009 | Shaffer | G01C 21/20 455/456.2 |
| 2009/0125228 | A1* | 5/2009 | Dicke | G01C 21/20 701/533 |
| 2014/0018061 | A1 | 1/2014 | Hadinata et al. | |
| 2015/0172908 | A1* | 6/2015 | Hadinata | G01C 21/3461 455/421 |
| 2015/0360688 | A1* | 12/2015 | Tanaka | B60W 10/06 701/93 |

OTHER PUBLICATIONS

Amendment (dated Mar. 17, 2014) for U.S. Appl. No. 13/933,100, filed Jul. 1, 2013.
Office Action (dated Jul. 3, 2014) for U.S. Appl. No. 13/933,100, filed Jul. 1, 2013.
Amendment (dated Sep. 30, 2014) for U.S. Appl. No. 13/933,100, filed Jul. 1, 2013.
Notice of Allowance (dated Feb. 3, 2015) for U.S. Appl. No. 13/933,100, filed Jul. 1, 2013.

* cited by examiner

ROUTE NAVIGATION FOR OPTIMAL MOBILE COVERAGE

CROSS REFERENCE TO RELATED APPLICATION

This application is a continuation application claiming priority to Ser. No. 13/933,100, filed Jul. 1, 2013, now U.S. Pat. No. 9,055,412, issued Jun. 9, 2015, which is continuation application to Ser. No. 12/186,226 filed Aug. 5, 2008 and now Abandoned.

BACKGROUND

1. Technical Field

The present invention generally relates to mobile communication systems and in particular to a method and system for searching for optimal mobile device coverage routing through the use of a provider's mobile coverage information, historical data, and consumer feedback.

2. Description of the Related Art

Currently mobile phones and other wireless capable devices are widely used for voice, text and video communications. The users of these devices have a paid subscription with their provider of choice. The providers have established networks with coverage that enables communications between two communication devices, and/or a starting and a destination mobile device. However, users occasionally experience disruption of communications at various times due to holes in the network (e.g. dropped calls). These inconsistencies are due to many causes including, for example, building and trees blocking cell towers, adverse weather conditions, and switching deficiencies when switching from one base station (cell tower) to another base station during an in-progress communication between two mobile devices.

Currently in the field of mobile communication systems, network coverage is improving, but issues of dropped communications still remain. With the later problem, no methods exist to improve, and provide maximum mobile (non-satellite) phone coverage when a communication is initiated between two mobile devices. Furthermore, the difficulty to manually attempt to augment routing to ensure mobile phone coverage is increased due to different coverage areas of different providers.

SUMMARY OF ILLUSTRATIVE EMBODIMENTS

Disclosed are a method and system for enabling the search for optimal mobile device coverage routing through the use of provider's mobile coverage information, historical data and consumer feedback. A utility within a mobile device or other device computes and provides an optimal mobile coverage route. The device receives a stating point/location and a destination point/location. The mobile device downloads a provider's mobile coverage information, accesses historical data stored by the mobile device, and obtains user feedback from the provider. The optimal mobile coverage route is then computed at the device, and the optimal mobile coverage route is provided via one of the following: a web site, or a text message (SMS) to, a voice operated feed, or any direct feed to the user of the mobile device. The computed optimal mobile coverage route is then used by the user of the mobile device when communicating with another mobile device while travelling from the starting point to the end point.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
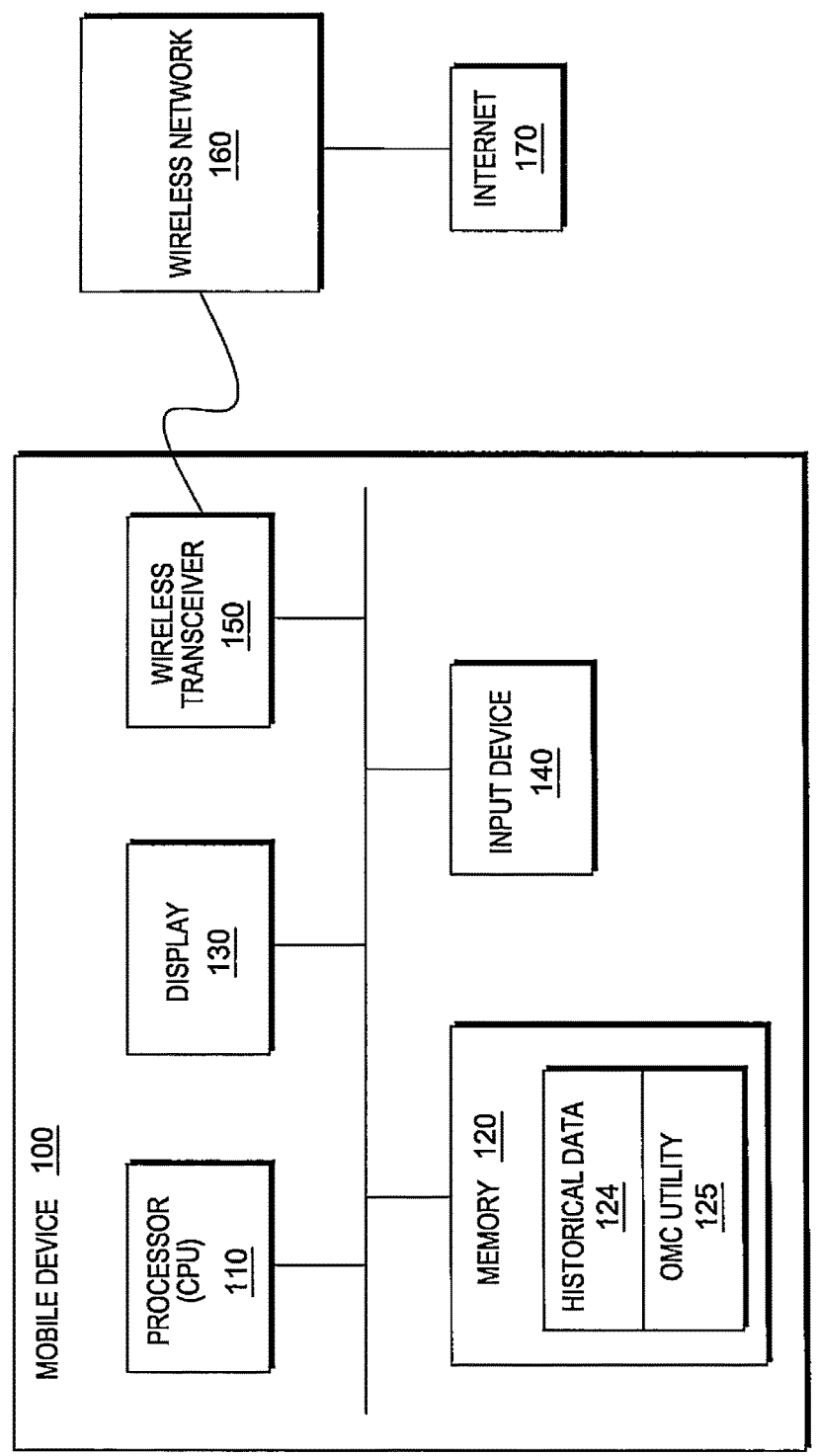
FIG. 1 is a block diagram of a mobile device configured with hardware and software components for implementing one or more embodiments of the invention.

The illustrative embodiments provide a method for enabling consumers to search for optimal mobile device coverage routing through the use of provider's mobile coverage information, historical data and consumer feedback.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. As utilized herein, the term "optimal mobile device coverage route" refers to a route of travel along which the mobile device has a highest overall (average) quality of service and experiences a lowest number of dropped calls and a highest overall signal strength when traversing the route between a starting point and an end point of the route. Other parameters may also be utilized to classify the "optimal" nature of the computed route, based on time factors and threshold values assigned to the quality of service desired, among others.

With reference now to the figures, FIG. 1 depicts a block diagram representation of a mobile device connected to a wireless network. Mobile device 100 comprises a processor or central processing unit (CPU) 110 connected to memory 120 via an internal system bus 105. Memory 120 stores the mobile device operating system (OS) (not shown), and applications (not shown), and specifically in the case of the present invention, the optimal mobile coverage (OMC) utility 125, and the historical data 124. Also connected to the internal system bus 105 is an input device 140. Input device 140 may be a keypad and/or any other mechanism for allowing interaction with the mobile device 100. Mobile device 100 also comprises a display 130 (which may double as a touch screen) to enable visual (or tactile) interaction with the mobile device 100.

The mobile device 100 is also illustrated with a wireless transceiver 150 coupled to the internal system bus 105. The wireless transceiver 150 enables the mobile device 100 to connect to one or more access points and/or to provider's wireless networks 160. Through these access points the mobile device 100 may indirectly connect to the Internet 170.

Notably, in addition to the above described hardware components of the mobile device 100, various features of the invention are completed via software (or firmware) code or logic stored within the memory 120 and executed by the (CPU) 110. Specifically illustrated within the memory 120 is optimal mobile coverage (OMC) utility 125.

In one implementation, OMC utility 125 may be a combination of multiple functional software components collectively providing the various functions of each individual software component when the corresponding code is executed by the CPU 110. For simplicity, OMC utility 125 is illustrated and described as a standalone or separate software/firmware component, which is stored in memory 120 to provide/support the specific novel functions described herein.

The CPU 110 executes OMC utility 125. In the illustrative embodiment, OMC utility 125 generates/provides several graphical user interfaces (GUI) to enable interaction with, or manipulation of the functional features of the OMC utility 125. Among the logic code/instructions provided by OMC utility 125, and which are specific to the invention, are (a) code/instructions for connecting to a wireless network, receiving a starting point and an end point of a travel route, receiving a provider's mobile coverage information, accessing historical data, obtaining user feedback; and (b) code to computing an optimal mobile device coverage route; and (c) code for outputting and utilizing the optimal mobile device coverage route in a communication between two mobile devices. For simplicity of the description, the collective body of code that enables these various features is referred to herein as OMC utility 125. According to the illustrative embodiment, when CPU 110 executes OMC utility 125, the mobile device 100 initiates a series of functional processes that enable the above functional features as well as additional features/functionality, which are described below within the description of FIGS. 2-4.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. Further, the term mobile device is used generally to represent any device that includes a processing component and logic/code that enables the device to perform the features described by the illustrative embodiments.

Thus, it is important that while an illustrative embodiment of the present invention is described in the context of a fully functional mobile device system with installed (or executed) software, those skilled in the art will appreciate that the software aspects of an illustrative embodiment of the present invention are capable of being used with other wireless capable devices, and that an illustrative embodiment of the present invention applies equally regardless of the particular type of wireless capable device. By way of example, a non exclusive list of types of wireless capable devices includes a car navigation system, a PDA, and a laptop computer.

Figure 2:
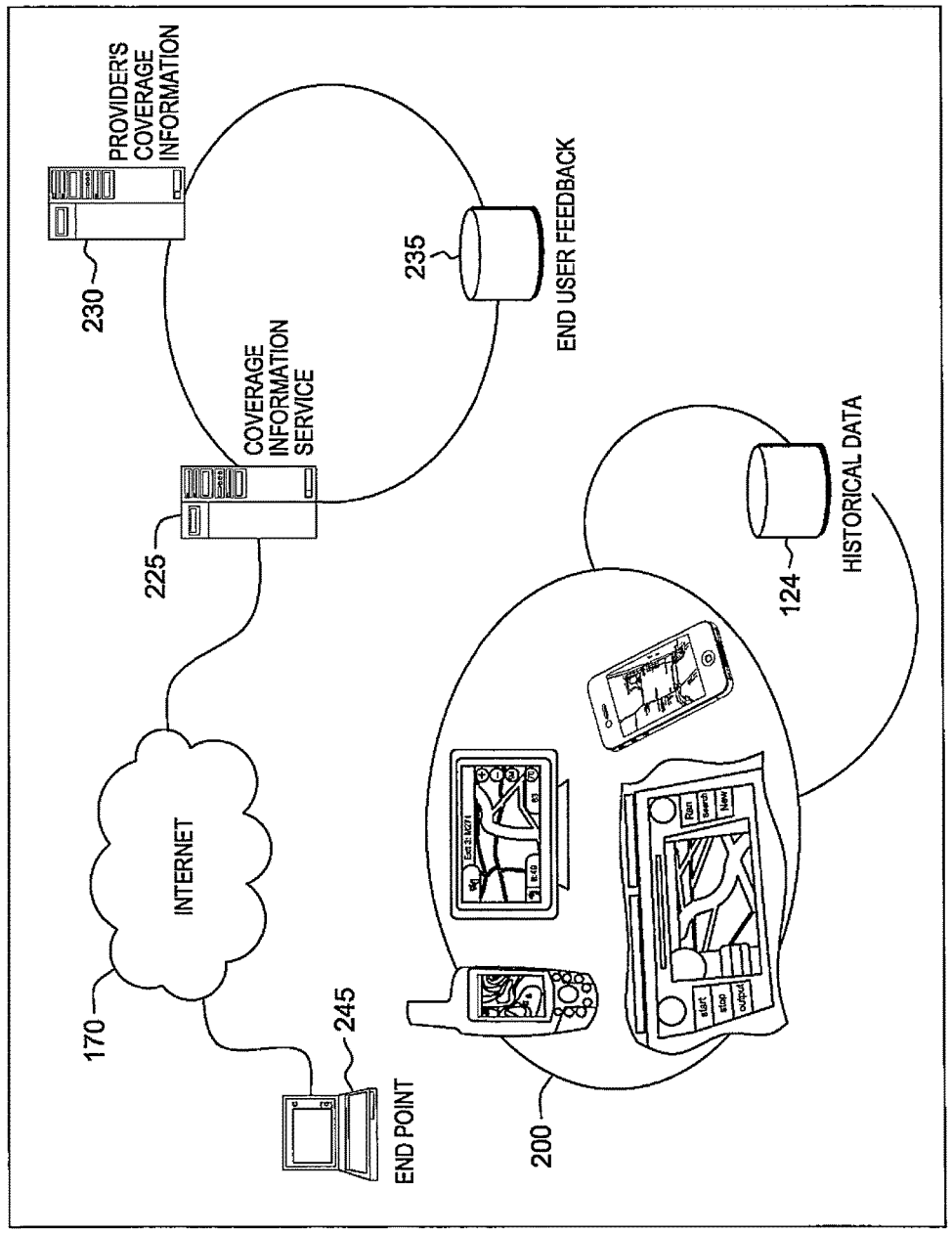
FIG. 2 is a system-level illustration of a communication system having a mobile device communicating with a provider's wireless network, in accordance with one embodiment of the invention.

With reference now to FIG. 2, there is provided a system-level illustration of a communication system having a wireless capable mobile device that communicates with/within a provider's wireless network. FIG. 2 includes multiple examples of wireless capable mobile devices 200. The wireless capable mobile device 200 may be a mobile device 100 as illustrated in FIG. 1, or any other wireless capable device (e.g. car navigation device, PDA, and others). The wireless capable mobile device 200 stores historical data 124 in its memory (e.g. memory 120 in the case of a mobile device 100). The wireless capable mobile device 200 interacts with the provider's wireless network to acquire the provider's coverage information 230, and end user feedback 235. In one embodiment of the invention, one or more of (a) coverage information service 225, (b) historical data 124 and (c) end user feedback 235 is/are provided to a route computing device 245 accessible via the Internet 240 or on the service provider's network. With this embodiment, computation of the optimal coverage route is performed by the route computing device 245 and then outputted. The output of the computed result may be to the mobile device 200 or to an output device associated with the route computing device 245. In one embodiment, the route computing device 245 selects the specific wireless capable mobile device 200 as the recipient device for delivery of the computed optimal mobile coverage route. This enables the user of the mobile device to have immediate access to the optimal route as the user traverses the route with the mobile device 200. In yet another embodiment, the computation of the optimal route occurs at the service provider's server (225), which is accessed by and generates output that is sent to either the mobile device 200 or the route computing device 245. With this embodiment, the route computing device operates solely as a client device that is used by a user to access the optimal mobile route computing service made available on the service provider's server (225).

Figure 3:
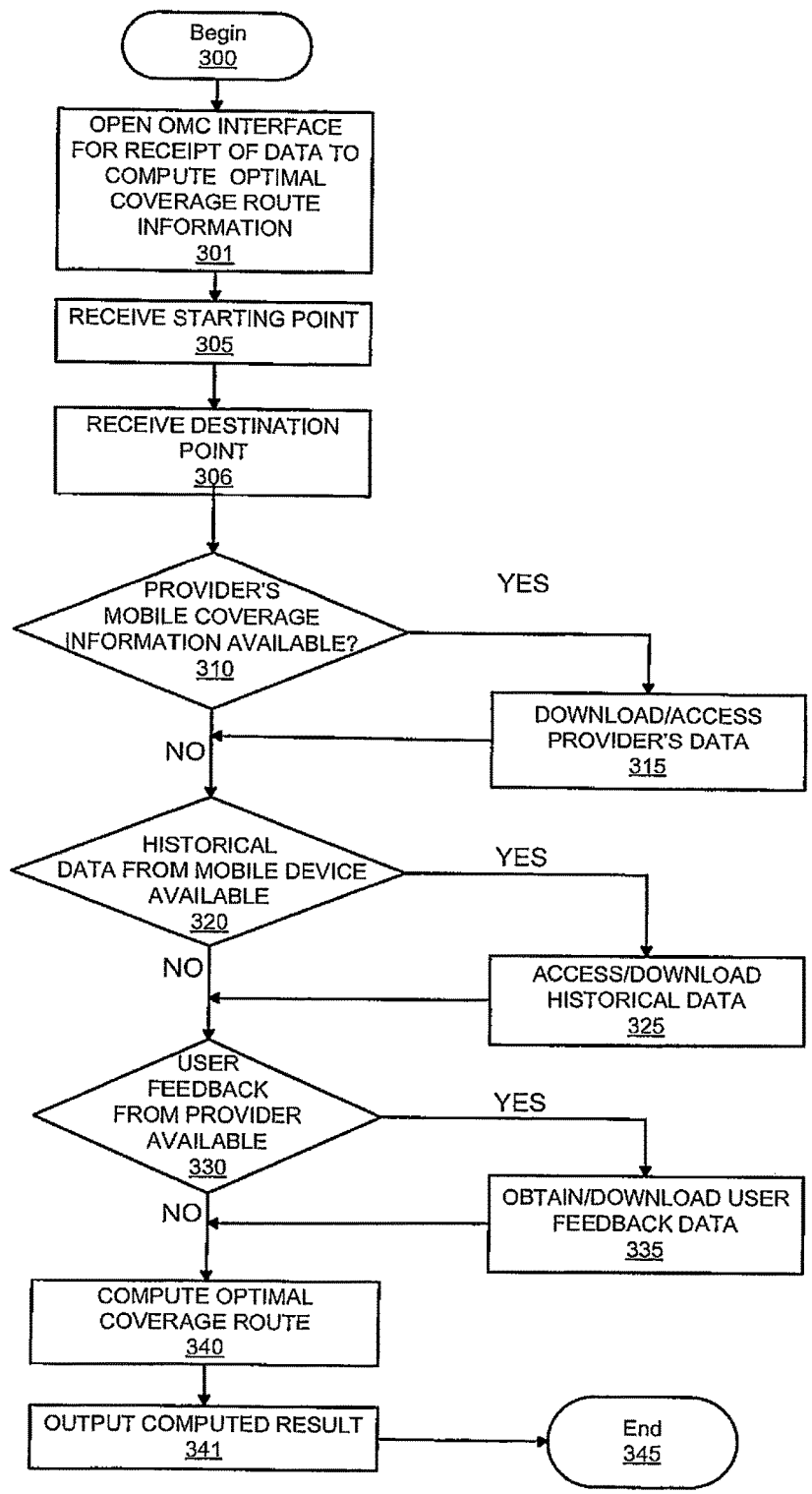
FIG. 3 is a flow chart of the process by which the features of the invention are implemented, in accordance with one embodiment of the invention.

FIG. 3 is flow chart illustrating the method by which the process of the illustrative embodiment is completed. Although the method illustrated in FIG. 3 may be described with reference to components shown in FIGS. 1-2, it should be understood that this is merely for convenience and alternative components and/or configurations thereof can be employed when implementing the method. Key portions of the method may be completed by OMC utility 125 executing within mobile device 100 (FIG. 1) or other wireless capable mobile device 200 and controlling specific operations of/on mobile device 100, and the method is thus described from the perspective of either/both OMC utility 125 and mobile device 100/200. In an alternate embodiment, the OMC utility may execute within the service provider server and receive inputs from a plurality of sources, included those sources depicted in FIG. 2, for example.

The process of the illustrated embodiment begins at initiator block 300 and proceeds to block 301, at which the OMC utility provides an OMC interface for entry by a user of the mobile device 100 of parameters/information for calculating an optimal route. The OMC interface may be opened on the mobile device 100. In an alternate embodiment, the OMC interface may be opened on a computing device connected to the wireless provider network, such as route computing device 245 of FIG. 2). Once a connection to the service is established (on mobile device 200 or via route computing device 245), the OMC utility initiates the processes by which the data/information required to perform the computation of the optimal mobile device coverage route. First, at block 305, the OMC utility 125 (or mobile device 100) receives an input of the starting point for the travel route. In one embodiment, the starting point may be entered manually. This latter embodiment is applicable to implementations in which the staring point (or ending point) is not necessarily entered via the mobile device, but rather by way of some other computing device, which may be networked with the wireless provider's server (or wireless network).

In one or more alternate embodiments, the starting point may be detected automatically through mobile device 100 by using cell tower triangulation. As provided herein, cell tower triangulation refers to a process that identifies the location of the mobile device 100 using signals of one or more nearby transmission towers to determine a location relative to the received/detected cell tower signals. In other embodiments, the starting point may be automatically detected via Global Positioning System (GPS) functionality available within the wireless capable mobile device (e.g., when the mobile device is equipped with a Global Positioning System (GPS) detection system).

Next, at block 306, the OMC utility 125 (or mobile device 100) receives an end (or destination) point. In one embodiment, the end point 306 may be derived automatically based on other inputs received, which inputs may be associated with other functions being supported. For example, when the optimal mobile coverage route computation is being provided/utilized in conjunction with a routing of a car navigation system, the desired end point may be derived automatically from the destination entry in the car navigation system. Further, in one embodiment, similar to the manual input of the starting point, the ending location may be manually entered, either in the mobile device or in some other networked computing device.

Other ways of receiving a starting point and an end point for optimal coverage route determination include (a) receipt via entry into a web site, (b) receipt via a text message (e.g., short message service—SMS), and receipt via a voice operated feed or other direct feed to the mobile device 100. In order to access a web site, the mobile device 100 connects to one or more access points (e.g. access points of a provider's wireless networks 160). Through these access points the mobile device 100 may connect indirectly to the Internet 170. Once an Internet connection is established, the web site may be accessed. Next, a starting point and an end point may be entered into web site. The web site may then complete the computation of the optimal route (as a third party service) and then return the optimal route to the mobile device, which receives the optimal route in response to entry of the starting and end point at the website.

In the embodiment in which the starting and end points are received via a text message, the text message containing a starting point and end point is received by the mobile device 100, which parses the message for the relevant data With the embodiment in which the starting point and end point are received via voice input, the user of the mobile device first calls a pre-established phone number, which connects to a voice-operated menu. The voice-operated menu includes selectable entries for starting point/location and end point/location. Once selection of starting point and the end point is completed, the background server (associated with the pre-established number) performs the computation and then returns the optimal route to the mobile phone device 100 along with the starting point and the end point.

Returning to the flow chart, at block 310, a determination is made whether the computation will include use of (or has access to) the provider's mobile coverage information. When the computation includes use of or has access to the provider's mobile coverage information, the provider's mobile coverage information is downloaded to the mobile device 100 (or route computing device 245), as shown at block 315. The mobile provider's coverage data information is collected from the mobile provider(s). Cooperation with the mobile provider(s) can be established to allow automatic feed of the provider's coverage data from the mobile provider(s) to the mobile device. Then, once the information is available and accessible, the provider's mobile coverage information 310 is downloaded to the mobile device 100. A similar determination is made at block 320 whether there is historical data available from the mobile device 100. When there is historical data available, that data is accessed/downloaded for use by the OMC utility. As provided by the described embodiments, the historical data 124 (FIG. 1) consist of locations where a communication drop took place, among other historical coverage information. The historical data may be stored in the mobile device's memory 120 or at the service provider's server (perhaps within the user's account). The historical data 124 may then be used if available. In the case of a new mobile device with no historical data, the historical data option will not be utilized within the computation.

At decision block 330, a decision is made whether there is available user feedback stored at the service provider. If there is user feedback stored at the service provider (server) and that user feedback is related to the general location of the start point, end point, and possible route in between the two points, the mobile device 100 will obtain/download the user feedback information 330 from the provider, as shown at block 335.

One way of collecting feedback from users is to allow users to submit communication drop location feedback. Feedback from users can be collected via multiple mediums. The feedback can be entered using a form in a specified provider's web site. Another way of collecting feedback is by having the user send (and the provider receiving) a text message to the provider's specified phone number or address. The users can also simply place a voice call to the provider, and provide the feedback to an operator, who can enter the feedback. In one embodiment, the provider may place a software agent on the mobile device that, from time to time, collects communication drop location information and forwards this information to the provider without requiring user interaction. The users' feedback may then be verified by the service provider before the feedback is integrated into the coverage data.

One or more of the received or entered information (including the starting and end points, the feedback information 330, the historical data 124, and the provider's mobile coverage information 310) are all used to compute the optimal mobile device coverage route, as shown at block 340. The optimal mobile device coverage route 340 is then outputted to and received by (the user of) the mobile device 100, as shown at block 341. Then the process ends at block 345.

Outputting of the computed optimal coverage route may occur by various methods. For example, the computed route may be outputted via a pull of the route data by a mobile device accessing a web site where a graphical and/or text-based mapping showing the optimal route is provided. As another example, the computed route may be forwarded to and downloaded on the mobile device and displayed (in display 130, for example). A text message (e.g., SMS) may be received at the mobile device detailing the optimal coverage route between a starting point and an end point. Also, in yet another example, a voice message may be transmitted to and received at the mobile device detailing the optimal mobile coverage route between a starting point and an end point.

In another embodiment, the process of computing the optimal coverage route 340 can be further enhanced by including other available information. This information may include: a list of available providers, signal strength for each of the providers, and the "lowest cost" solution provided by each of the providers calculated based on the charge of inter-provider charges, depending on the provider used. The computation of the optimal mobile coverage route may take into account any or all the information in order to get the optimal mobile coverage route. The optimal mobile coverage route will then be used to route/transmit a communication between two communication devices.

Figure 4:
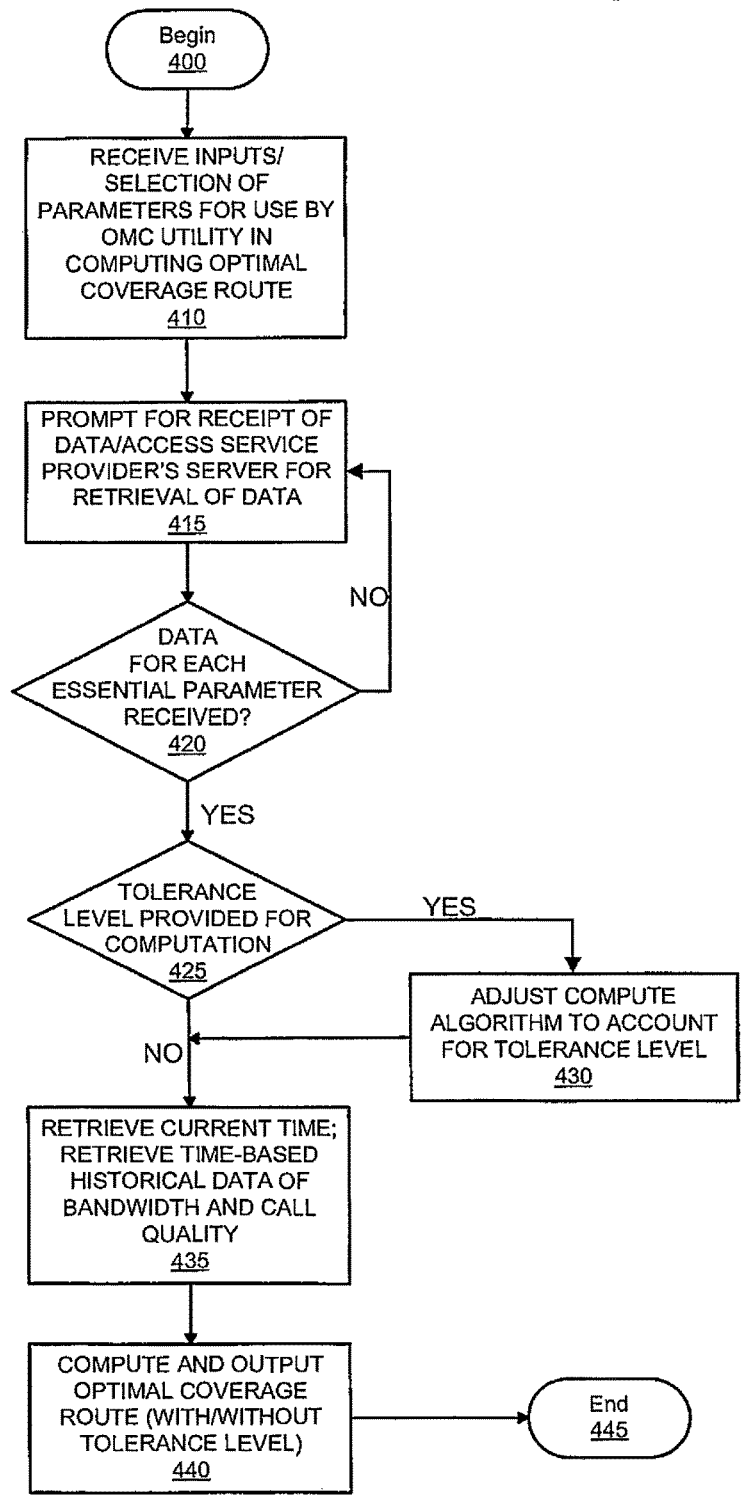
FIG. 4 is a flow chart of the process by which a starting time, an end time, and a tolerance level are used to determine optimal mobile device coverage routes, in accordance to one embodiment of the invention.

FIG. 4 is flow chart illustrating another embodiment of the invention. In this embodiment, a time-based component to allow for computation of optimal mobile coverage OMC 125 during a specific time interval is used. Additionally, a tolerance threshold level is established. The tolerance threshold level provides a lower level of coverage that is less than the 100% optimal mobile coverage and which accounts for (or allows) the risk of brief (intermittent) disconnections. The process of the illustrated embodiment begins at initiator block 400 and proceeds to block 410 at which the OMC utility is configured to receive certain inputs/selections of parameters that may be utilized by the OMC utility to calculate the optimal coverage route for a mobile device. Following, at block 415, the OMC utility prompts for receipt of certain data requiring user input and/or accesses the service provider's server to autonomically retrieve other data that does not require direct user input. A decision is made at block 420 whether data for each essential parameter has been received, where the essential parameters includes those that are required before a computation of an optimal coverage route can be performed. For example, a start point and an end point are essential parameters. The designer of the application may identify other parameters as essential.

If all essential data is received, a determination is made at block 425 whether tolerance level information was also received (from the user input). The tolerance level takes into consideration certain level of risk for computing of a less than 100% optimal mobile coverage. If tolerance level information was received, a tolerance level adjustment is made in the computation algorithm to account for the tolerance level data received for the computation, as shown at block 430. At block 435, a current time value is determined or retrieved. The current time value is utilized to determine, based on historical or other data, the level of bandwidth usage, drop calls, service quality reduction, and other factors, corresponding to that time of travel within the particular area in which the mobile device will be travelling. With the tolerance level and current time of travel determined, these data points are utilized along with the other parameters to compute the optimal coverage route, which is then outputted, as shown at block 440. The process then ends at block 445.

In the flow charts above, one or more of the methods are embodied in a computer readable medium containing computer readable code such that a series of steps are performed when the computer readable code is executed on a wireless mobile device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

According to an alternative embodiment, the method and system for searching for optimal mobile coverage route may be implemented by a paid-for service provider or third party, who establishes this service, such as for a monthly subscription fee, per use fee, advertising revenue, or other renumeration.

According to another embodiment, the method and system for searching for optimal mobile coverage route can also be implemented in a navigation device. First, updates of mobile coverage and user feedback may be downloaded into the navigation device manually, or provided automatically by a service provider. Next, the navigation device provides an option to include the computed optimal mobile coverage route. If this option is selected, then the route between a starting point and a destination point is then displayed based on the computed optimal mobile coverage route. The displayed route may not be the shortest route or the fastest route but rather the route where optimal mobile coverage is available. This implementation finds applicability with business call scenarios where optimal coverage is determined for a business call that is ongoing while the call participant is travelling from the starting point to the ending/destination point.

According to another embodiment, the method and system for searching for optimal mobile coverage route can also be provided as a web service such as Route Planner (web service), to enhance the current route planning offering. Many Simple Route Planner web services are available online, and are used to find a route between two locations. A Route Planner web service can be enhanced by including an option to include the computed optimal mobile coverage route. If this option is selected, then the route between a starting point and a destination point is then displayed based on the computed optimal mobile coverage route. The displayed route may not be the shortest route or the fastest route but rather the route where optimal mobile coverage is available.

According to another embodiment, the method and system for searching for optimal mobile coverage route can be implemented in a tracking system (or security system). Tracking systems (e.g. systems for transporting valuable goods) need to be in contact with their central location at all times. The tracking systems can include the optimal mobile coverage route when planning a route between two locations. The optimal mobile coverage route will then enable the tracking system's wireless mobile communication device to send signals to their central location, and stay in contact with the central location during a trip between two locations.

As will be further appreciated, the processes in embodiments of the present invention may be implemented using any combination of software, firmware or hardware. As a preparatory step to practicing the invention in software, the programming code (whether software or firmware) will typically be stored in wireless mobile device memories such as ROMs, PROMs, etc., thereby making an article of manufacture in accordance with the invention. The article of manufacture containing the programming code is used by executing the code directly from memory of wireless mobile device.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for determining an optimum coverage travel route and delivering the optimum coverage travel route to a user which provides the user with immediate access to the optimal coverage route as the user traverses the optimal coverage route with a cell phone, said method comprising:
   determining, by a Global Positioning System (GPS) detection system in the cell phone, a location of the cell phone, wherein a starting location of a road vehicle is the location of the cell phone;
   receiving, by one or more processors of the cell phone, a travel destination by the vehicle, a starting time for the user to begin travel along the travel route from the starting location of the vehicle to the travel destination, and a telephone carrier service for the cell phone, wherein said receiving the travel destination comprises receiving the travel destination from an Internet web site via an access point of a service provider's wireless network, and wherein the cell phone stores historical data from which measures of cell phone coverage may be determined;
   determining, by the one or more processors using the historical data in the cell phone, measures of cell phone coverage along the travel route during the travel beginning at the starting time, wherein the measures of cell phone coverage comprise amounts of dropped calls by the telephone carrier service in one or more areas along the travel route in which the telephone carrier service provides cell phone coverage, and respective times of day during which the dropped calls occur relative to a time of the travel along the travel route beginning at the starting time;
   determining, by the one or more processors, the travel route as an optimum coverage route, from the starting location to the travel destination, that has a lowest number of dropped calls between the starting location and the travel destination during said respective times of day; and
   delivering, by the one or more processors, the optimum coverage route to the user which provides the user with immediate access to the optimal coverage route as the user traverses the optimal coverage route with the cell phone, wherein said delivering comprises displaying on a display within the cell phone, by the one or more processors, the optimum coverage route and the measures of cell phone coverage along the travel route during the travel beginning at the starting time.

2. The method of claim 1, wherein the measures of cell phone coverage comprise one or more periods of time during the travel that the telephone carrier service does not provide cell phone coverage.

3. The method of claim 2, said method further comprising:
   for the one or more areas along the travel route in which the telephone carrier service does not provide cell phone coverage, estimating, b the one or more processors, respective periods of time during which the vehicle will traverse the respective one or more areas along the travel route in which the telephone carrier service does not provide cell phone coverage.

4. The method of claim 1, wherein the historical data was gathered at least on part by the cell phone during prior travels to the one or more areas along the travel route.

5. The method of claim 1, wherein the starting time is approximately a current time.

6. The method of claim 1, wherein the access point establishes an Internet connection between the cell phone and the Internet web site via the access point which enables the cell phone to access the Internet web site to receive the travel destination.

7. A computer program product, comprising one or more computer-readable hardware storage devices storing computer-readable program instructions which, upon being executed by one or more processors of a cell phone, perform a method for determining an optimum coverage travel route and delivering the optimum coverage travel route to a user which provides the user with immediate access to the optimal coverage route as the user traverses the optimal coverage route with a cell phone said method comprising:
   determining, by a Global Positioning System (GPS) detection system in the cell phone, a location of the cell phone, wherein a starting location of a road vehicle is the location of the cell phone;
   receiving, by the one or more processors, a travel destination by the vehicle, a starting time for the user to begin travel along the travel route from the starting location of the vehicle to the travel destination, and a telephone carrier service for the cell phone, wherein said receiving the travel destination comprises receiving the travel destination from an Internet web site via an access point of a service provider's wireless network, and wherein the cell phone stores historical data from which measures of cell phone coverage may be determined;
   determining, by the one or more processors using the historical data in the cell phone, measures of cell phone coverage along the travel route during the travel beginning at the starting time, wherein the measures of cell phone coverage comprise amounts of dropped calls by the telephone carrier service in one or more areas along the travel route in which the telephone carrier service provides cell phone coverage, and respective times of day during which the dropped calls occur relative to a time of the travel along the travel route beginning at the starting time;

determining, by the one or more processors, the travel route as an optimum coverage route, from the starting location to the travel destination, that has a lowest number of dropped calls between the starting location and the travel destination during said respective times of day; and delivering, by the one or more processors, the optimum coverage route to the user which provides the user with immediate access to the optimal coverage route as the user traverses the optimal coverage route with the cell phone, wherein said delivering comprises displaying on a display within the cell phone, by the one or more processors, the optimum coverage route and the measures of cell phone coverage along the travel route during the travel beginning at the starting time.

8. The computer program product of claim 7, wherein the measures of cell phone coverage comprise one or more periods of time during the travel that the telephone carrier service does not provide cell phone coverage.

9. The computer program product of claim 8, said method further comprising:

for the one or more areas along the travel route in which the telephone carrier service does not provide cell phone coverage, estimating, by the one or more processors, respective periods of time during which the vehicle will traverse the respective one or more areas along the travel route in which the telephone carrier service does not provide cell phone coverage.

10. The computer program product of claim 7, wherein the historical data was gathered at least on part by the cell phone during prior travels to the one or more areas along the travel route.

11. The computer program product of claim 7, wherein the starting time is approximately a current time.

12. The computer program product of claim 7, wherein the access point establishes an Internet connection between the cell phone and the Internet web site via the access point which enables the cell phone to access the Internet web site to receive the travel destination.

13. A system, comprising a cell phone, said cell phone comprising one or more processors, one or more memories, and one or more computer-readable hardware storage devices storing computer-readable program instructions which, upon being executed by the one or more processors via the one or more memories, perform a method for determining an optimum coverage travel route and delivering the optimum coverage travel route to a user which provides the user with immediate access to the optimal coverage route as the user traverses the optimal coverage route with a cell phone said method comprising:

determining, by a Global Positioning System (GPS) detection system in the cell phone, a location of the cell phone, wherein a starting location of a road vehicle is the location of the cell phone;

receiving, by the one or more processors, a travel destination by the vehicle, a starting time for the user to begin travel along the travel route from the starting location of the vehicle to the travel destination, and a telephone carrier service for the cell phone, wherein said receiving the travel destination comprises receiving the travel destination from an Internet web site via an access point of a service provider's wireless network, and wherein the cell phone stores historical data from which measures of cell phone coverage may be determined;

determining, by the one or more processors using the historical data in the cell phone, measures of cell phone coverage along the travel route during the travel beginning at the starting time, wherein the measures of cell phone coverage comprise amounts of dropped calls by the telephone carrier service in one or more areas along the travel route in which the telephone carrier service provides cell phone coverage, and respective times of day during which the dropped calls occur relative to a time of the travel along the travel route beginning at the starting time;

determining, by the one or more processors, the travel route as an optimum coverage route, from the starting location to the travel destination, that has a lowest number of dropped calls between the starting location and the travel destination during said respective times of day; and delivering, by the one or more processors, the optimum coverage route to the user which provides the user with immediate access to the optimal coverage route as the user traverses the optimal coverage route with the cell phone, wherein said delivering comprises displaying on a display within the cell phone, by the one or more processors, the optimum coverage route and the measures of cell phone coverage along the travel route during the travel beginning at the starting time.

14. The system of claim 13, wherein the measures of cell phone coverage comprise one or more periods of time during the travel that the telephone carrier service does not provide cell phone coverage.

15. The system of claim 14, said method further comprising:

for the one or more areas along the travel route in which the telephone carrier service does not provide cell phone coverage, estimating, by the one or more processors, respective periods of time during which the vehicle will traverse the respective one or more areas along the travel route in which the telephone carrier service does not provide cell phone coverage.

16. The system of claim 13, wherein the historical data was gathered at least on part by the cell phone during prior travels to the one or more areas along the travel route.

17. The system of claim 13, wherein the starting time is approximately a current time.

18. The system of claim 13, wherein the access point establishes an Internet connection between the cell phone and the Internet web site via the access point which enables the cell phone to access the Internet web site to receive the travel destination.

* * * * *